Nov. 20, 1923.
R. H. A. HOLLER
POTATO CUTTER
Filed April 3, 1923
1,474,717
2 Sheets-Sheet 1
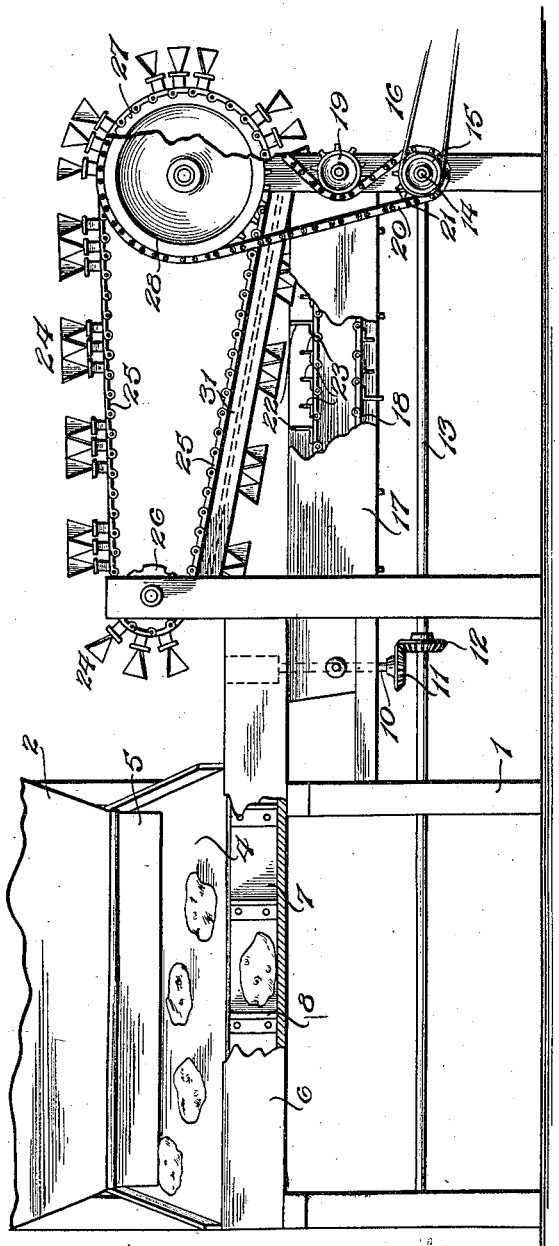
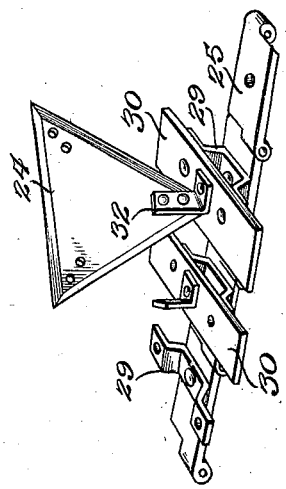
Inventor
R.H.A. Holler
By Lacey Lacey, Attorneys Nov. 20, 1923.
R. H. A. HOLLER
POTATO CUTTER
Filed April 3, 1923
1,474,717
2 Sheets-Sheet 2
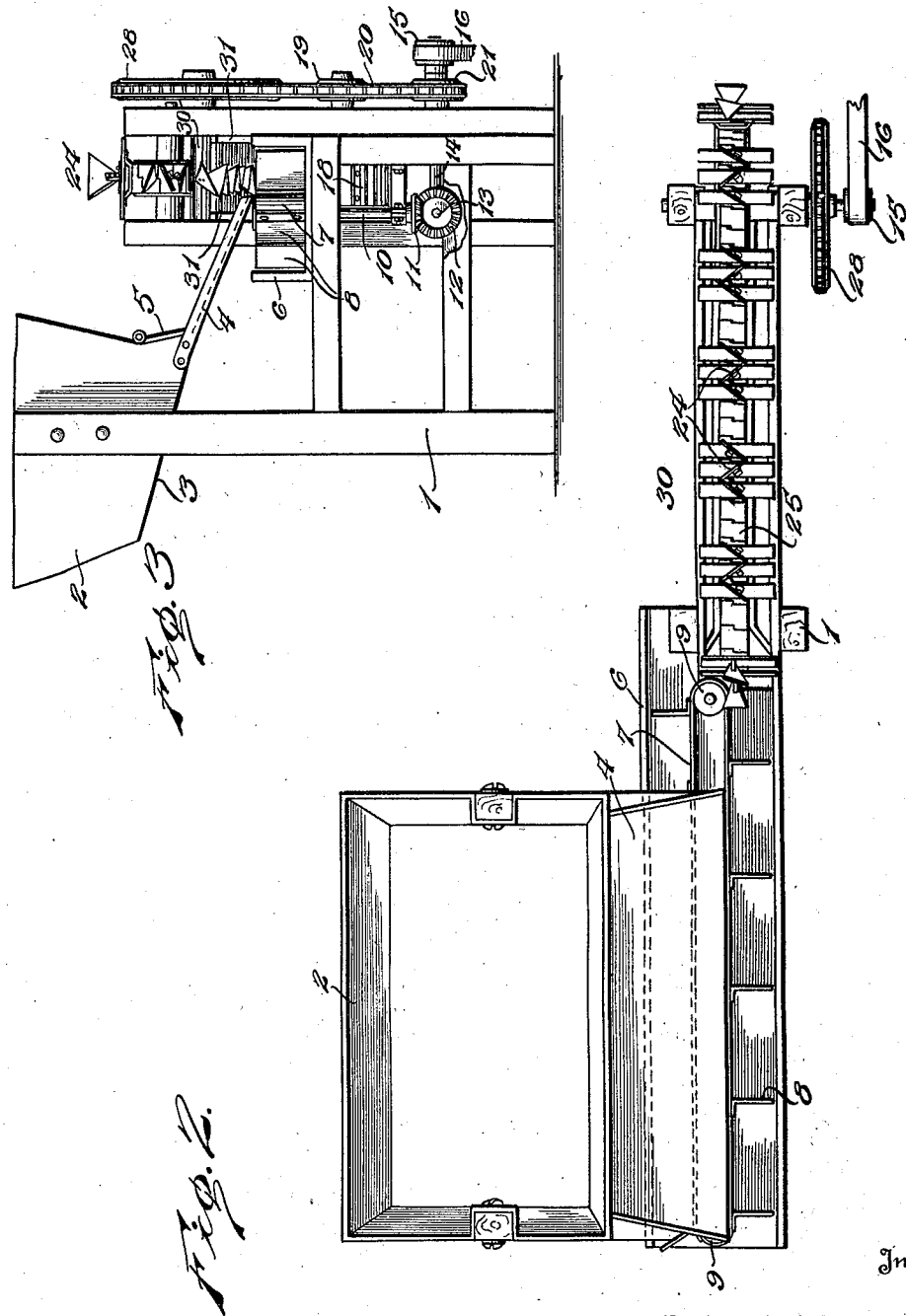

Patented Nov. 20, 1923.

1,474,717

UNITED STATES PATENT OFFICE.

RALPH H. A. HOLLER, OF DRAYTON, NORTH DAKOTA.

POTATO CUTTER.

Application filed April 3, 1923. Serial No. 629,644.

*To all whom it may concern:*

Be it known that I, RALPH H. A. HOLLER, a citizen of the United States, residing at Drayton, in the county of Pembina and State of North Dakota, have invented certain new and useful Improvements in Potato Cutters, of which the following is a specification.

This invention is a machine for cutting seed potatoes for planting and has for its object the provision of a novel mechanism whereby the potatoes will be rapidly and cleanly cut into portions suitable for planting. The invention seeks to provide a novel mechanism whereby as the potatoes are cut they will be carried to a point of delivery and there released from the knives so as to be caught in a suitable receptacle, and it is also an object of the invention to provide a mechanism whereby the potatoes will be cut progressively as they are conveyed to the point of discharge. Other objects of the invention will appear incidentally in the course of the following description, and the invention resides in certain novel features which will be particularly pointed out in the appended claims.

In the drawings:

Figure 1 is a side elevation, with parts broken away, of an apparatus embodying my improvements;

Fig. 2 is a plan view of the same;

Fig. 3 is an end view;

Fig. 4 is a detail perspective view showing one of the knives and its mounting.

The supporting frame 1 may be of any preferred or convenient construction and a hopper 2 erected at one end of the frame may likewise be of any desired form and dimensions provided the bottom thereof is inclined, as shown at 3, so as to direct the potatoes to a feeding conveyer whereby the potatoes will be deposited singly in position to be successively operated upon by the knives. A chute 4 extends from one side of the hopper and a door 5 is disposed above the said chute so as to retard the exit of the potatoes from the hopper and prevent them passing to the conveyer in such numbers as to choke the same. Arranged upon the supporting frame at one side of the hopper and under the chute 4 is a trough or conveyer frame 6, and an endless belt 7 is disposed edgewise upon the bottom of this trough and medially of the sides thereof, as will be readily understood upon reference to Figs. 1 and 2. The chute 4 projects over the trough so as to discharge between the far side of the same and the conveyer belt 7, and upon the conveyer belt are secured baffles or pusher plates 8 which project laterally from the conveyer belt at a right angle to the surface of the same and are spaced equidistantly along the same. The baffles or pushers should be wide enough to extend from the belt to the adjacent side of the trough so that a pocket will be formed by successive baffles or pushers and the side of the trough to receive the potatoes singly, as indicated in Fig. 2. The belt 7 is trained around vertically disposed rollers 9 mounted within the trough 6 adjacent the ends thereof, and one of said rollers is secured to the upper end of a shaft 10 extending downwardly within the main frame and equipped at its lower end with a beveled gear 11 meshing with a similar gear 12 secured upon a shaft 13 extending longitudinally of the frame. The shaft 13 extends to the delivery end of the frame and is there operatively connected by beveled gearing with a driving shaft 14 disposed transversely of the frame and equipped at one end with a band pulley 15 to which motion may be imparted through a belt 16 extending to any convenient prime motor.

A conveyer frame 17 is disposed longitudinally of the main frame with one end extending under the delivery end of the trough 6, as shown clearly in Fig. 1, and within the said conveyer frame 17 is mounted an endless feeding conveyer 18 consisting of a chain of links trained around suitable pulleys or sprocket wheels at the ends of the frame. The shaft of one of the pulleys or sprocket wheels is extended through the side of the main frame and there equipped with a sprocket wheel 19 which is driven through a sprocket chain 20 trained around a sprocket 21 secured upon the driving shaft 14. At regular intervals of the chain 18, I secure upon the links of the same transverse brackets or pushers 22 which are adapted to maintain the potatoes in spaced relation just as they are maintained in such relation by the pushers 8 of the first described conveyer, and, between the said brackets 22, pins 23 are carried by the links of the conveyer chain, the said pins piercing the potatoes so that they will be not only fed positively by the conveyer but will be prevented from adhering to the knives and being carried repeatedly through the machine instead of being discharged into the receptacle provided for the cut potatoes.

Mounted above the feeding conveyer 18 within the main frame is an endless series of cutters, the same comprising a plurality of groups of knives 24 and an endless chain or belt by which said knives are carried over a prescribed path. The conveyer preferably consists of a series of pivotally connected links 25 trained around sprockets 26 and 27 carried by shafts suitably mounted in the main frame, motion being imparted to the belt or series of links through a sprocket gear 28 secured upon the shaft of the sprocket 27 and about which the chain 20 is trained, as clearly shown in Fig. 1. As shown most clearly in Fig. 4, brackets or cutter heads 29 are secured to the links 25 and to the ends of the said brackets are secured guide plates 30 which are disposed transversely of the links 25 and have their ends adapted to run in grooved guide bars 31 secured rigidly upon the main frame just above the conveyer 18 and converging downwardly toward the said conveyer and the discharge end of the machine, as shown clearly in Fig. 1. Attaching feet or brackets 32 are secured upon the straps or bars 30 and the knives 24 are secured to the said feet. As clearly shown in the drawings, the knives are preferably triangular in form and are arranged in groups of three, the numbers of each group being disposed in angular relation, as shown most clearly in Figs. 2 and 3, so that a zigzag cut will be formed through the potatoes engaged by the knives.

It will be readily understood upon reference to Fig. 1 that the opposed runs of the feeding conveyer 18 and of the chain of knives travel in the same general direction and, owing to the inclined arrangement of the knives, they will not pass abruptly into the spaces between the pushers 22 but will enter the same gradually so that they will cut through the potatoes progressively. This progressive action of the knives makes a clean cut and does not crush the potatoes so that the loss is minimized and, generally, will be entirely eliminated. As the knives pass around the sprockets 26 and 27, they will, of course, assume positions on different radii of the sprocket and, consequently, will be separated so that, as they pass from positions over the feeding conveyer, they will release the cut potatoes which will then be carried over the end of the feeding conveyer and will drop into the receptacle placed conveniently near the same. The potatoes, consequently, will be separated from the knives instead of adhering to the same to travel repeatedly through the machine therewith, and this separation and release of the cut portions of the potatoes will be accelerated by the provision of the pins 23. The machine is automatic in its operation, except that it may sometimes be necessary to provide a workman to regulate the passage of the potatoes from the hopper and distribute them as they roll to the first conveyer but such work is not laborious and requires no special skill.

It will be understood that the exact form of links employed in the cutter-carrying chain is immaterial, and that by using two parallel chains the guide bars may be omitted, and other changes may be made in the minor details without departing from the spirit or scope of the invention as the same is defined in the appended claims.

Having thus described the invention, what is claimed as new is:

1. A potato-cutting machine comprising a feeding conveyer, and a plurality of cutters mounted above the conveyer to travel with the conveyer and progressively approach the same toward the discharge end thereof.

2. A potato cutter comprising a feeding conveyer adapted to carry potatoes to a point of discharge, and a plurality of groups of knives co-operating with said conveyer and traveling therewith and progressively approaching the same as they proceed toward the point of discharge.

3. A potato-cutting machine comprising a potato carrier, and groups of knives adapted to progressively enter the potatoes on the carrier, the knives in each group being disposed in angular relation.

4. A potato-cutting machine comprising a potato carrier, a plurality of groups of knives arranged above said carrier to progressively cut potatoes upon the carrier, the knives in each group being adapted to separate as they leave the potatoes.

5. A potato-cutting machine comprising a feeding conveyer constructed to maintain potatoes in spaced relation, a series of groups of knives arranged above the said conveyer and in inclined relation thereto, the groups of knives being spaced to conform to the spaced relation of potatoes upon the conveyer, and means for operating the conveyer and the series of knives.

6. In a potato-cutting machine, a cutter comprising an endless conveyer, brackets secured in spaced relation upon the said conveyer, and knives secured upon said brackets in spaced groups, the knives in each group being disposed in angular relation.

7. In a machine for cutting potatoes, the combination of a feeding conveyer consisting of an endless belt, brackets disposed in spaced relation upon the belt and pins upon the belt between the brackets, and a plurality of cutters co-operating with said conveyer to cut progressively through potatoes on the conveyer.

8. A potato-cutting machine comprising a supporting frame, a hopper arranged at one end of the frame, a chute leading from the side of the hopper over the frame, a trough below the delivery end of said chute, a vertically disposed conveyer belt within said trough, pushers upon the said belt disposed at right angles thereto and in spaced relation whereby to define potato-receiving pockets, a second conveyer belt receiving potatoes from said trough, and an endless series of groups of knives disposed above the second conveyer and arranged to progressively cut through potatoes on said conveyer.

In testimony whereof I affix my signature.

RALPH H. A. HOLLER. [L. S.]